May 22, 1956  A. W. TRONNIER  2,746,351
PHOTOGRAPHIC OBJECTIVE OF THE MODIFIED TRIPLET
TYPE AND A MENISCUS SHAPED NEGATIVE MEMBER
AXIALLY SEPARATED THEREFROM
Filed March 3, 1953  4 Sheets-Sheet 1 f/4.5

INVENTOR
Albrecht Wilhelm Tronnier
BY: Marc Plum
ATTORNEYS

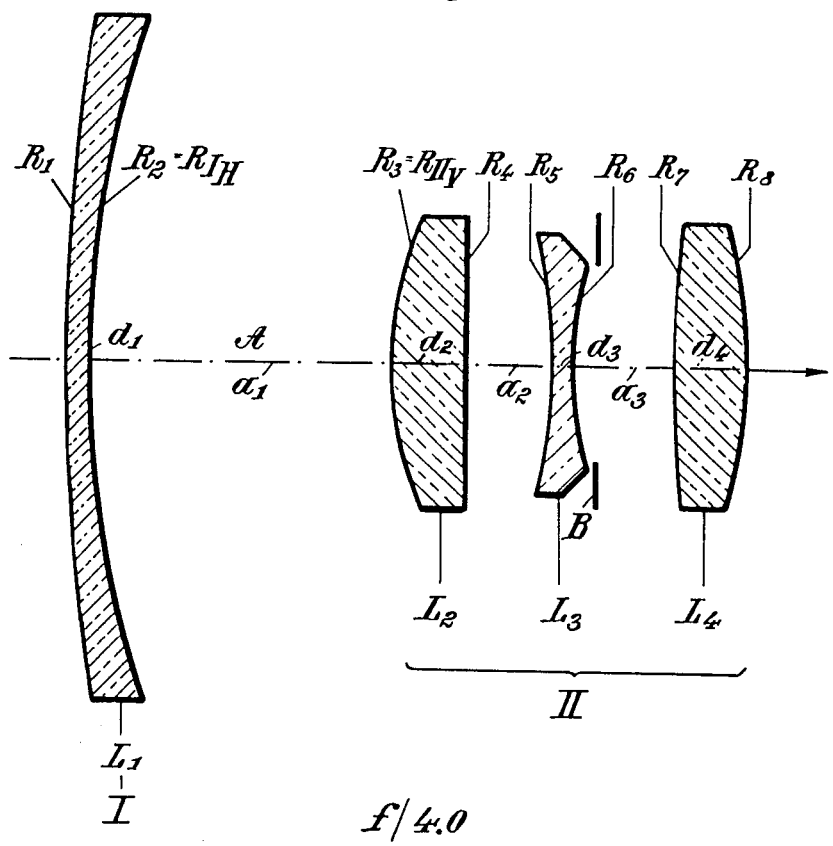

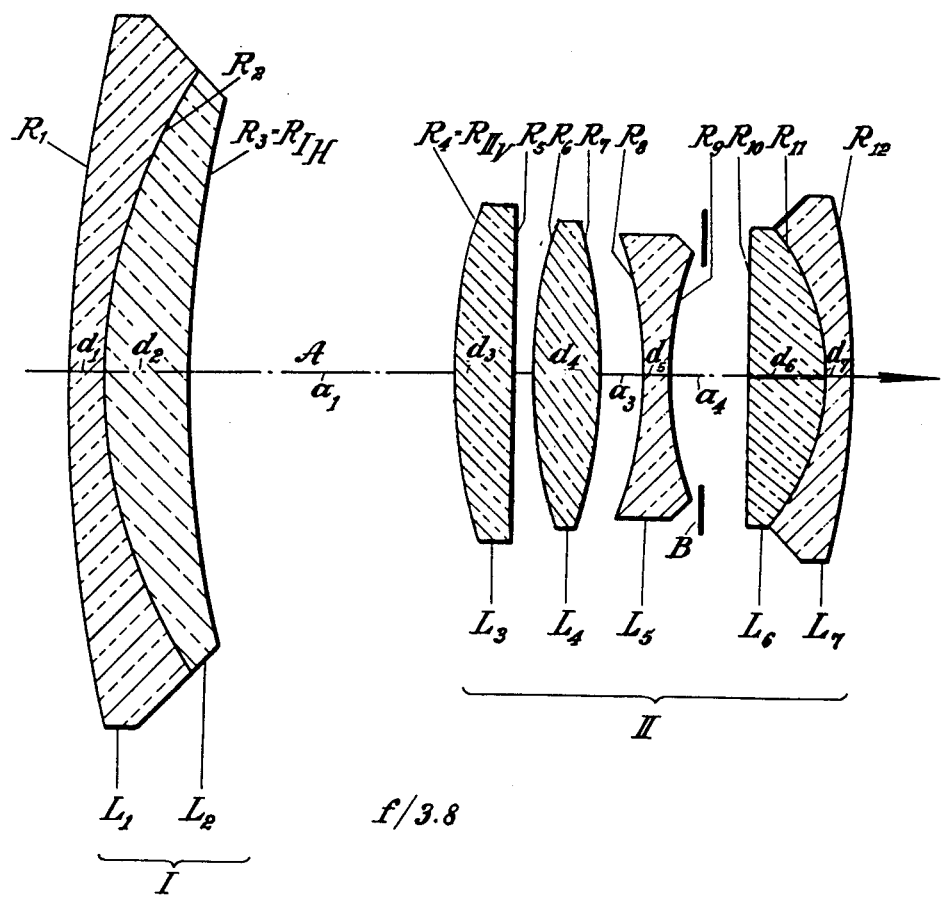

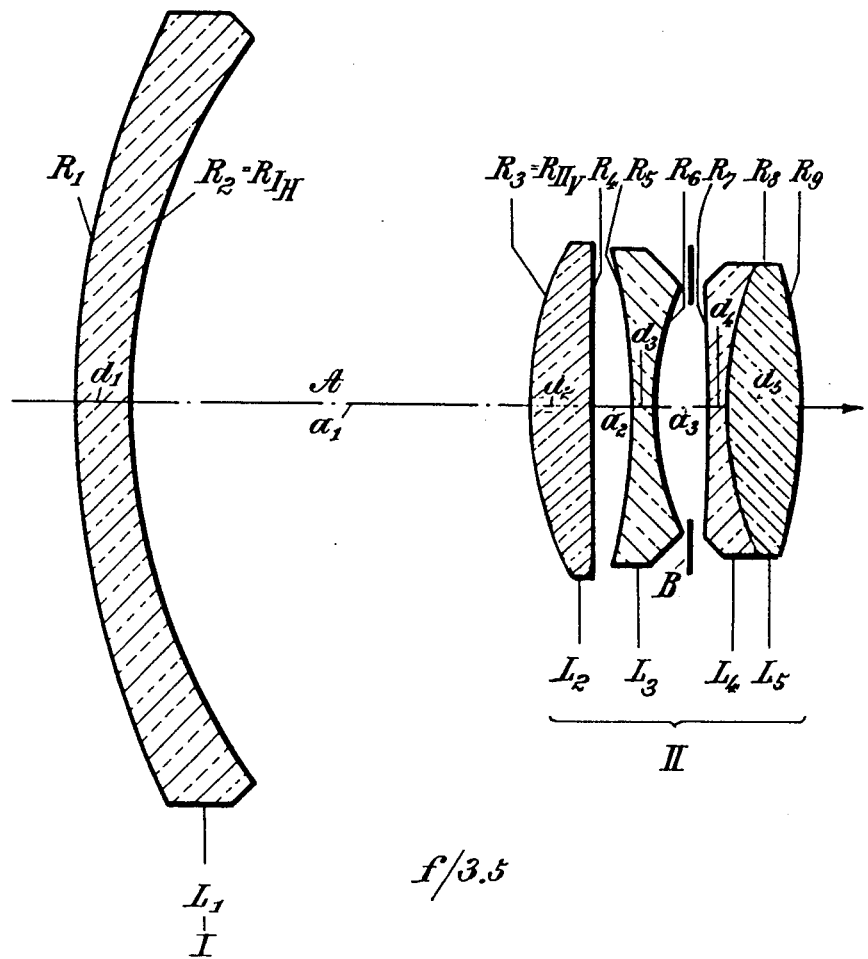

United States Patent Office 2,746,351
Patented May 22, 1956

2,746,351

PHOTOGRAPHIC OBJECTIVE OF THE MODIFIED TRIPLET TYPE AND A MENISCUS SHAPED NEGATIVE MEMBER AXIALLY SEPARATED THEREFROM

Albrecht Wilhelm Tronnier, Gottingen, Germany, assignor to Voigtländer, A. G., Braunschweig, Germany, a corporation of Germany Application March 3, 1953, Serial No. 339,953

Claims priority, application Germany March 5, 1952

9 Claims. (Cl. 88—57)

This invention relates to photographic objectives of the modified triplet type which define, at middle relative apertures up to over 1:3.5, a field of vision, the effective diameter of which is considerably larger than the focal length of the objective.

The objectives embodying the present invention belong to that sub-class of the modified triplet type, in which the normal triplet variation containing several lenses (II) is preceded at a finite distance (A) on the side of the major conjugate by a meniscus-shaped member (I), the inherent refractive power of which is negative and which is thus of opposite power relative to the converging principal system arranged on the image side.

Objectives of this sub-class of the modified triplet type have been suggested previously. In their fundamental structure, the meniscus-shaped negative member (I) arranged on the side of the object, is separated from the converging principal system (II) by an air space (A) of such length that the total over-all length of the objective is considerably larger than 1.6 times or even 2.1 times the equivalent focal length. Such structure normally requires lenses of unusually large diameter, particularly in the case of the member arranged on the side of the object.

This disadvantage which, for reasons connected with merely external dimensions, may even cause a limitation of the effective image angle, is safely eliminated according to the present invention by the application of a novel principle of construction for this sub-class of the modified triplet type.

In using this novel principle of construction, the overall length of the total objective is distinctly smaller than 1.5 times its equivalent focal length and is preferably smaller than ⅔ of said focal length; simultaneously, the diverging front system (I), which is turned to the major conjugate, is separated from the converging principal system (II), which includes the diaphragm, by an air space (A) which is distinctly smaller than ¾ of the equivalent focal length of the total objective.

Application of the above mentioned novel principle of construction to the above mentioned sub-class of the modified triplet type, results in the possibility of rather favorable dimensions and the objectives designed in accordance with said principle are not subjected to undesired limitations of the field of vision relative to definition and also to illumination of the image area.

In the known systems of this sub-class of triplet variations, the curvature of the diverging meniscus-shaped front member (I) was selected in such manner that its strongly diverging inner surface, which corresponds to the radius of curvature denoted here $R_{I_H}$, and limits the adjacent large air space (A), was very strongly curved. This curvature, which was a "strong curvature" also in comparison with the curvature of the lens surface, which limits said large air space (A) on the other side and corresponds to the surface having the radius here denoted $R_{II_V}$, was selected in such manner that the quotient of the lengths of radii of said two lens surfaces enclosing the large air space (A) was smaller than 0.78. The fact that this quotient was smaller than 1 indicates that the surface having a radius corresponding to $R_{I_H}$ was of stronger curvature than the surface having a radius corresponding to $R_{II_V}$, so that the enclosed air space had the shape of a flat positive meniscus, the limiting surface of which on the image side, had a radius which was larger than 110% of the equivalent focal length of the total objective.

In contrast to the beforementioned known systems, it has now been found to be of advantage to select the curvature of the limiting lens surfaces of the large air space (A) between the two system members of opposite power, in such manner that the quotient of the radius on the object side ($R_{I_H}$) and the radius on the image side ($R_{II_V}$) is distinctly larger than 1 and larger than ⅘. This novel design means that according to the invention air space (A) has the shape of a negative meniscus and its limiting surfaces form a converging pair of surfaces.

It has been further found that the meniscus-shaped air space according to the invention, should have a strong concave curvature toward the image side, in order to reduce the difference of astigmatic position between the sagittal and meridional image shell in the lateral portions of field of vision. Therefore, according to the invention, the lens surface having the radius $R_{II_V}$ is selected in such manner that this radius is smaller than the equivalent focal length and is preferably smaller than ¾ of this equivalent focal length.

The new construction principle according to the invention opens numerous novel applications of the above described sub-class of modified triplets, some of these applications being illustrated, by way of example, in the appended drawings, in which Figure 1 diagrammatically illustrates an objective embodying the invention, which has a relative aperture of 1:4.5 and contains a front part consisting of a composite negative meniscus (I) and, on the image side, a converging part (II), which is a three-membered triplet;

Figure 2 illustrates a particularly simple embodiment of the invention, which contains only 4 individual lenses, at a relative aperture of 1:4.0;

Figure 3 illustrates an objective of still higher light-transmitting capacity, having a relative aperture of 1:3.8, and Figure 4 illustrates an objective of simple structure and still higher light-transmitting capacity.

Figure 1:
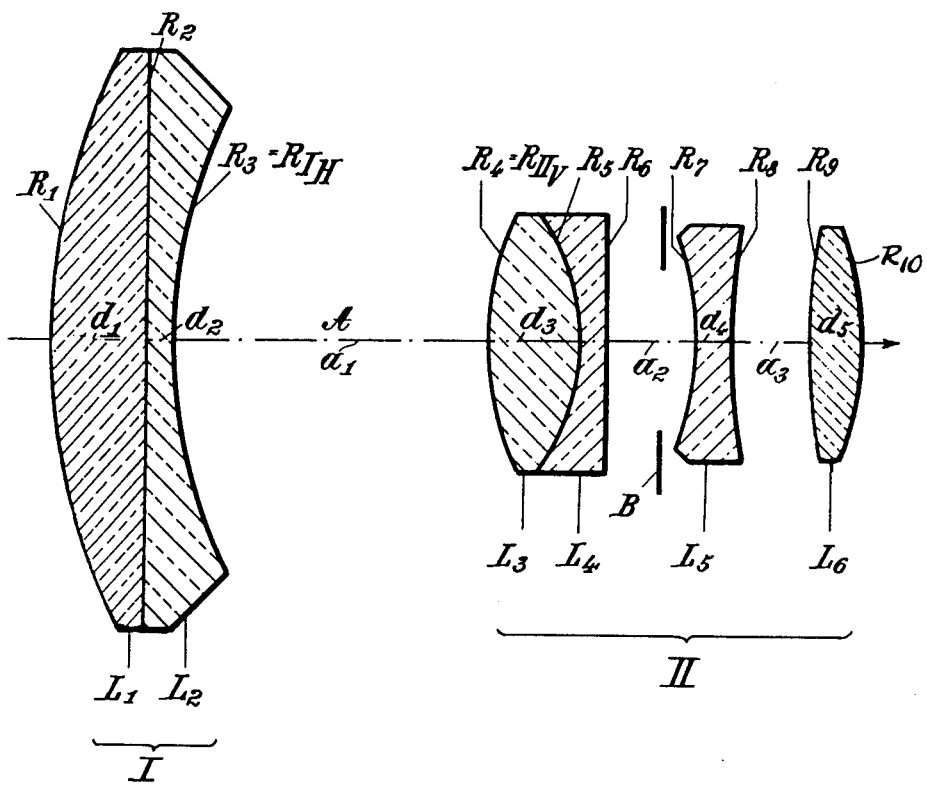

The data of the objective shown in Figure 2 are listed in the following Table 1. At the higher relative aperture of this objective, partial achromatization of the meniscus-shaped front member (I) could be given up, in view of the use of a glass of low color dispersion, and this represents a simplification and improvement. Moreover, by using a glass of very heavy refractive power ($n_2$) for the front member of rear portion (II) of the objective, the converging cemented surface shown in this member in Figure 1, could be likewise saved.

The embodiment shown in Figure 3 comprises a front part (I) consisting of two lenses and a converging principal part (II) which contains 4 members separated by air spaces.

In the objective illustrated in Figure 4, the negative meniscus of the front part (I) could be made of a single lens, due to the use of a fluorine-crown glass of very low refractive power. The use of this feature—in combination with the simultaneous use of glass of heavy refractive power for the front lens of part (II) of the objective—results in a very high difference of refractive values at air space (A) and this, in turn, permits a relatively simple construction of objective part II even at very high light-transmitting capacity, without adverse effect on the optical performance. The relative aperture, of the objective shown in Figure 4, the data of which are listed in the following Table 2, amounts to 1:3.4, corresponding to an effective aperture of 0.294 for the unit of focal length.

In the drawings, the objectives are illustrated in axial sections of the lenses. The direction of light from the major conjugate to the minor conjugate is indicated by an arrow coinciding with the optical axis. The individual lenses L, the radii of curvature R, the thickness of lenses $d$, and their axial distances $a$, are consecutively numbered, starting on the side of the major conjugate, toward the side of the minor conjugate, and the reference symbols in Figures 2 and 4 are in conformity with the symbols used in Table 1 and Table 2. The glasses used are characterized in the same sequence by their mean refractive indices $n_d$ referred to the yellow spectral line of helium light and, in connection with their color dispersion, by their Abbe number $\nu$.

The embodiments illustrated in Figures 1–4 are shown for an equivalent focal length of f=200 mm. The data given in Table 1 and Table 2 are based on a focal length of 1, and the radii of lenses, the thickness of lenses and distances in air, measured on the optical axis, are stated in the same unit.

TABLE 1
(*Figure 2*)

[Relative aperture 1:4.0    f=1.000    G=0.64900 total over-all length]

| | | | |
|---|---|---|---|
| $R_1=+2.04416$ | $d_1=0.02299$ | $n_1=1.65770$ | $\nu_1=51.2$ |
| $R_{I_H}=R_2=+1.14062$ | $a_1=0.28934$ | A=air | |
| $R_{II_V}=R_3=+0.33883$ | $d_2=0.07572$ | $n_2=1.66777$ | $\nu_2=42.1$ |
| $R_4=\infty$ | $a_2=0.07842$ | air | |
| $R_5=-0.58150$ | $d_3=0.02163$ | $n_3=1.69842$ | $\nu_3=30.1$ |
| $R_6=+0.35519$ | $a_3=0.09735$ | air | diaphragm space |
| $R_7=+1.45971$ | $d_4=0.06355$ | $n_4=1.69140$ | $\nu_4=54.9$ |
| $R_8=-0.46852$ | | | |

As shown by the above data, G=0.64900, is smaller than 1.5 f and smaller than 1.333 f.

Simultaneously, $a_1$=A=0.28934 is smaller than 0.75. Furthermore as ($R_{I_H}=+1.14062$) is larger than ($R_{II_V}=+0.33883$), their difference is positive, and air space A has the shape of a negative meniscus, the limiting surfaces of which form thus a converging pair of surfaces. Radius $R_{II_V}$=0.33883 is smaller than f=1.000 and smaller than ¾ f. Finally, the quotient of $R_{I_H}$ and $R_{II_V}$, i. e. of the radii of surfaces limiting air space A $$\frac{+1.14062}{+0.33883}=3.366349$$

i. e. distinctly larger than 1.333.

TABLE 2
(*Figure 4*)

[Relative aperture 1:3.4    f=1.000    G=0.69367 total over-all length]

| | | | |
|---|---|---|---|
| $R_1=+0.83349$ | $d_1=0.05409$ | $n_1=1.46522$ | $\nu_1=65.2$ |
| $R_{I_H}=R_2=+0.62409$ | $a_1=0.37997$ | A=air | |
| $R_{II_V}=R_3=+0.30073$ | $d_2=0.06220$ | $n_2=1.65770$ | $\nu_2=51.2$ |
| $R_4=\infty$ | $a_2=0.03786$ | air | |
| $R_5=-0.66798$ | $d_3=0.02028$ | $n_3=1.60266$ | $\nu_3=38.4$ |
| $R_6=+0.28566$ | $a_3=0.05679$ | air | diaphragm space |
| $R_7=-2.41474$ | $d_4=0.01352$ | $n_4=1.58360$ | $\nu_4=46.2$ |
| $R_8=+0.32926$ | $d_5=0.06896$ | $n_5=1.69347$ | $\nu_5=53.5$ |
| $R_9=-0.44595$ | | | |

The above data show that G=0.69367 is smaller than 1.5 f and smalled than ⅔ f.

Simultaneously, $a_1$=0.37997 is smaller than 0.75. Furthermore, as ($R_{I_H}=+0.62409$) is larger than ($R_{II_V}=+0.30073$), air space A has the shape of a negative meniscus, the limiting surfaces of which form a converging pair of surfaces. Radius $R_{II_V}$=0.30073 is smaller than f=1.000 and also smaller than ¾ of this value. Finally, the quotient of radii $R_{I_H}$ and $R_{II_V}$ of the surfaces limiting air lens A is $$\frac{+0.62409}{+0.30073}=2.075250$$

i. e. distinctly larger than 1.333.

It will be understood from the above that the modified triplets embodying the present invention contain on the side of the object, as a first part, a meniscus-shaped negative front member (I), which is separated from the second part (II), of the objective by an air space, the outer surfaces of said front member being concave relative to the diaphragm. The over-all length G, which is a sum of the lens thicknesses and the air distances between the lenses, is smaller than 1.50 f, i. e. 1.5 times the equivalent focal length of the total objective, and preferably smaller than ⅔ f. The air lens between part (I) and (II) has the shape of a negative meniscus, its thickness is smaller than ¾ f, the difference of radii $$(R_{I_H}-R_{II_V})$$

is positive and the quotient $$\left(\frac{R_{I_H}}{R_{II_V}}\right)$$

is larger than 1.0 and specifically larger than ⅓. The value of radius $R_{II_V}$ is smaller than f and specifically smaller than ¾ f.

The objectives shown in Figures 2 and 4 and in Table 1 (relating to Figure 2) and Table 2 (relating to Figure 4) are further characterized by the following data, in which F denotes the equivalent focal length and $F_{L_1}$, $F_{L_2}$ ... etc. denote the focal length of the individual lens elements.

[Based on F=100.0 mm.]

| Figure 2 (Table 1) | Figure 4 (Table 2) |
|---|---|
| $F_{L_1}=-392$ mm. | $F_{L_1}=-535$ mm. |
| $F_{L_2}=+50.7$ mm. | $F_{L_2}=+45.7$ mm. |
| $F_{L_3}=-31.6$ mm. | $F_{L_3}=-33.2$ mm. |
| $F_{L_4}=+51.3$ mm. | $F_{L_{4/5}}=+60.7$ mm. |

Furthermore, $$0.9\ F<-F_{L_1}<9.0\ F$$
$$0.3\ F<F_{L_2}<0.9\ F$$
$$0.2\ F<-F_{L_3}<0.6\ F$$
$$0.3\ F<F_{L_{4/5}}<0.9\ F$$

The radii of curvature, and the length of air space A in the objectives characterized by the data in Table 1 and Table 2, are in the following ranges:

*Numerical Example 1*

$$\left.\begin{array}{l} 1.4 \ F < +R_1 < 3 \ F \\ 0.7 \ F < +R_2 < 2 \ F \end{array}\right\} I$$

0.15 F < A < 0.75 F $$\left.\begin{array}{l} 0.20 \ F < +R_3 < 0.60 \ F \\ F < \pm R_4 < \infty \\ 0.25 \ F < -R_5 < 0.90 \ F \\ 0.20 \ F < +R_6 < 0.60 \ F \\ \text{Diaphragm} \\ 0.5 \ F < \pm R_7 < \infty \\ 0.30 \ F < -R_8 < 0.60 \ F \end{array}\right\} II$$

*Numerical Example 2*

$$\left.\begin{array}{l} 0.5 \ F < +R_1 < 1.5 \ F \\ 0.4 \ F < +R_2 < 0.9 \ F \end{array}\right\} I$$

0.20 F < A < 0.75 F $$\left.\begin{array}{l} 0.20 \ F < +R_3 < 0.60 \ F \\ F < \pm R_4 < \infty \\ 0.30 \ F < -R_5 < F \\ 0.20 \ F < +R_6 < 0.60 \ F \\ \text{Diaphragm} \\ 0.5 \ F < \pm R_7 < \infty \\ 0.20 \ F < +R_8 < 0.60 \ F \\ 0.30 \ F < -R_9 < 0.75 \ F \end{array}\right\} II$$

It will be understood that this invention is not limited to the specific materials, values and other specific details described above and can be carried out with various modifications without departing from the scope of the invention as defined in the appended claims.

In the objectives embodying my invention the value of G is in the range between 0.45 f and 1.50 f or between 0.45 f and 1.33 f; the value of A is in the range between 0.20 f and 0.75 f, or between 0.15 f and 0.75 f; the value of the quotient $R_{I_H}/R_{II_V}$ is in the range between 1 and 5, or in the range between 1.33 and 5; and the value of $R_{II_V}$ is in the range between 0.2 f and f or in the range between 0.20 f and 0.75 f.

What is claimed is:

1. A photographic objective of the modified triplet type comprising a converging triplet system containing a plurality of lenses formed as three air-spaced components and including a diaphragm, and a meniscus shaped member of negative refractive power axially separated by an air space from said triplet system on the side of the major conjugate, the outer surfaces of said meniscus shaped member and said triplet system being concave relative to the said diaphragm, the said objective satisfying the conditions and $$.45 \ f < G < 1.50 \ f$$

and $$.20 \ f < A < 0.75 \ f$$

wherein G stands for the over-all length of the objective, f stands for the equivalent focal length of the objective and A is the thickness of the air space measured along the optical axis.

2. A photographic objective as claimed in claim 1, which meets the condition $$0.45 \ f < G < 1.33 \ f$$

3. A photographic objective as claimed in claim 1, in which the air space has the shape of a negative meniscus and $R_{I_H}$ and $R_{II_V}$ have positive values and $R_{II_V}$ is smaller than $R_{I_H}$, and which meets the condition $$5 > \frac{R_{I_H}}{R_{II_V}} > 1$$

wherein $R_{I_H}$ stands for the radius of curvature of the lens surface limiting the air space on the side of the major conjugate and $R_{II_V}$ stands for the radius of curvature of the lens surface limiting the air space on the side of the minor conjugate.

4. A photographic objective as claimed in claim 1, in which the air space has the shape of a negative meniscus and $R_{I_H}$ and $R_{II_V}$ have positive values and $R_{II_V}$ is smaller than $R_{I_H}$ and which meets the conditions $$5 > \frac{R_{I_H}}{R_{II_V}} > 1$$

and $$0.2 \ f < R_{II_V} < f$$

wherein $R_{I_H}$ stands for the radius of curvature of the lens surface limiting the air space on the side of the major conjugate and $R_{II_V}$ stands for the radius of curvature of the lens surface limiting the air space on the side of the minor conjugate and f stands for the equivalent focal length of the objective.

5. A photographic objective as claimed in claim 1, in which the air space has the shape of a negative meniscus and $R_{I_H}$ and $R_{II_V}$ have positive values and $R_{II_V}$ is smaller than $R_{I_H}$ and which meets the condition $$5 > \frac{R_{I_H}}{R_{II_V}} > 1.33$$

wherein $R_{I_H}$ stands for the radius of curvature of the lens surface limiting the air space on the side of the major conjugate and $R_{II_V}$ stands for the radius of curvature of the lens surface limiting the air space on the side of the minor conjugate.

6. A photographic objective as claimed in claim 1, in which the air space has the shape of a negative meniscus and $R_{I_H}$ and $R_{II_V}$ have positive values and $R_{II_V}$ is smaller than $R_{I_H}$, and which meets the conditions $$5 > \frac{R_{I_H}}{R_{II_V}} > 1$$

and $$0.2 \ f < R_{II_V} < 0.75 \ f$$

wherein $R_{I_H}$ stands for the radius of curvature of the lens surface limiting the air space on the side of the major conjugate and $R_{II_V}$ stands for the radius of curvature of the lens surface limiting the air space on the side of the minor conjugate and f stands for the equivalent focal length of the objective.

7. A photographic objective as claimed in claim 1, in which the focal lengths of the individual lens elements are in the following ranges:

$$0.9 \ F < -F_{L_1} < 9.0 \ F$$
$$0.3 \ F < F_{L_2} < 0.9 \ F$$
$$0.2 \ F < -F_{L_3} < 0.6 \ F$$
$$0.3 \ F < F_{L_{4/5}} < 0.9 \ F$$

wherein F stands for the equivalent focal length and $F_{L_1}$, $F_{L_2}$ . . . etc. stand for the focal lengths of the individual elements.

8. A photographic objective as claimed in claim 1, in which the radii of curvature of the lens elements and the length of the air space separating the meniscus-shaped negative member arranged on the side of the object from the converging principal system are in the following ranges:

1.4 F < +R₁ < 3 F 0.7 F < +R₂ < 2 F 0.15 F < A < 0.75 F 0.20 F < +R₃ < 0.60 F

F < ±R₄ < ∞

0.25 F < −R₅ < 0.90 F 0.20 F < +R₆ < 0.60 F 0.5 F < ±R₇ < ∞

0.30 F < −R₈ < 0.60 F wherein F stands for the equivalent focal length, A stands for the length of said air space and $R_1$, $R_2$ ... etc. stand for the radii of curvature consecutively numbered, starting on the side of the major conjugate.

9. A photographic objective as claimed in claim 1, in which the radii of curvature of the lens elements and the length of the air space separating the meniscus-shaped negative member arranged on the side of the object from the converging principal system are in the following ranges:

$$0.5\,F < +R_1 < 1.5\,F$$
$$0.4\,F < +R_2 < 0.9\,F$$
$$0.20\,F < A < 0.75\,F$$
$$0.20\,F < +R_3 < 0.60\,F$$
$$F < \pm R_4 < \infty$$
$$0.30\,F < -R_5 < F$$
$$0.20\,F < +R_6 < 0.60\,F$$
$$0.5\,F < \pm R_7 < \infty$$
$$0.20\,F < +R_8 < 0.60\,F$$
$$0.30\,F < -R_9 < 0.75\,F$$

wherein F stands for the equivalent focal length, A stands for the length of said air space and $R_1$, $R_2$ ... etc. stand for the radii of curvature consecutively numbered, starting on the side of the major conjugate.

References Cited in the file of this patent

UNITED STATES PATENTS

| | | |
|---|---|---|
| 1,897,262 | Kitroser | Feb. 14, 1933 |
| 1,955,590 | Lee | Apr. 17, 1934 |
| 2,126,126 | Merte | Aug. 9, 1938 |
| 2,341,385 | Kingslake et al. | Feb. 8, 1944 |
| 2,548,569 | Tolle | Apr. 10, 1951 |
| 2,559,844 | Bennett | July 10, 1951 |
| 2,649,022 | Angenieux | Aug. 18, 1953 |